US012616942B2

(12) United States Patent
Tomescu

(10) Patent No.: US 12,616,942 B2
(45) Date of Patent: May 5, 2026

(54) FLAT SHEET MEMBRANE WITH INTEGRAL POSTS

(71) Applicant: THETIS ENVIRONMENTAL INC., Hamilton (CA)

(72) Inventor: Alexandru Valeriu Tomescu, Mount Hope (CA)

(73) Assignee: THETIS ENVIRONMENTAL INC., Hamilton (CA)

( * ) Notice: Subject to any disclaimer, the term of this patent is extended or adjusted under 35 U.S.C. 154(b) by 921 days.

(21) Appl. No.: 17/431,375

(22) PCT Filed: Feb. 27, 2020

(86) PCT No.: PCT/CA2020/050263
§ 371 (c)(1),
(2) Date: Aug. 16, 2021

(87) PCT Pub. No.: WO2020/172753
PCT Pub. Date: Sep. 3, 2020

(65) Prior Publication Data
US 2022/0134290 A1 May 5, 2022

Related U.S. Application Data

(60) Provisional application No. 62/811,689, filed on Feb. 28, 2019.

(51) Int. Cl.
*B01D 69/10* (2006.01)
*B01D 67/00* (2006.01)
*B01D 69/06* (2006.01)
(52) U.S. Cl.
CPC ... *B01D 69/1071* (2022.08); *B01D 67/00135* (2022.08); *B01D 69/061* (2022.08)

(58) Field of Classification Search
CPC .......... B01D 69/1071; B01D 67/00135; B01D 69/061; B01D 69/06; B01D 69/10; B01D 2313/146; B01D 69/12
(Continued)

(56) References Cited

U.S. PATENT DOCUMENTS 6,634,190 B2 10/2003 Didier-Laurent
7,862,718 B2 1/2011 Doyen et al.
(Continued)

FOREIGN PATENT DOCUMENTS

DE          8902259 U1    4/1990
WO     2006091157 A1    8/2006
(Continued)

OTHER PUBLICATIONS

European Patent Application No. 20763540.0, Extended European Search Report dated Sep. 2, 2022.
(Continued)

*Primary Examiner* — Ekandra S. Miller-Cruz

(57) ABSTRACT

A membrane, for example a flat sheet membrane, has posts extending from a separation layer. The posts extend through one or more supporting structures such as a substrate layer and/or a permeate carrier, between two separation layers, or both. A post may help to attach the separation layer to a supporting structure, attach two supporting structures together, strengthen a supporting structure and/or attach two separation layers together. In some examples, one or more supporting structures, which may be temporary or remain in the membrane, are made with openings for posts. A liquid containing the separating layer material is cast over the supporting structure or structures and some of the liquid flows at least part way through the openings before the liquid is solidified. A temporary supporting structure may be removed, for example dissolved. In other examples, two
(Continued)

supporting structures are held apart in a casting knife while posts are formed.

9 Claims, 7 Drawing Sheets

(58) Field of Classification Search
USPC .................................................... 210/500.21
See application file for complete search history.

(56) References Cited

U.S. PATENT DOCUMENTS

| | | | |
|---|---|---|---|
| 8,393,477 | B2 | 3/2013 | Kamleiter et al. |
| 9,919,273 | B2 | 3/2018 | Doyen et al. |
| 2002/0027103 | A1 | 3/2002 | Ando et al. |
| 2005/0087070 | A1 | 4/2005 | Odaka et al. |
| 2013/0186827 | A1 | 7/2013 | Farr et al. |
| 2016/0121005 | A1 | 5/2016 | Nakahara et al. |
| 2017/0080390 | A1 * | 3/2017 | Tomescu ................ B01D 61/22 |

FOREIGN PATENT DOCUMENTS

| WO | 2008141935 | A1 | | 11/2008 | |
|---|---|---|---|---|---|
| WO | WO-2009135529 | A1 | * | 11/2009 | ........... B01D 63/081 |
| WO | 2010110739 | A1 | | 9/2010 | |
| WO | 2011026879 | A1 | | 3/2011 | |
| WO | 2012098130 | A1 | | 7/2012 | |
| WO | 2013113928 | A1 | | 8/2013 | |
| WO | 2018215985 | A1 | | 11/2018 | |

OTHER PUBLICATIONS

Futselaar, Harry, "The Transverse Flow Membrane Module: Construction, Performance and Applications, "Thesis University of Twente, Netherlands, 1993, pp. 153-183.
International Patent Application No. PCT/CA2020/050263, International Preliminary Report on Patentability, dated Sep. 10, 2021.
International Patent Application No. PCT/CA2020/050263, International Search Report and Written Opinion, dated May 28, 2020.

* cited by examiner

FLAT SHEET MEMBRANE WITH INTEGRAL POSTS

RELATED APPLICATIONS

This application is a National Stage Entry of International Application No. PCT/CA2020/050263, filed Feb. 27, 2020, which claims the benefit of, and priority to, U.S. provisional patent application No. 62/811,689, Flat Sheet Membrane with Integral Posts, filed on Feb. 28, 2019, which is incorporated herein by reference.

FIELD

This specification relates to filtration membranes, for example microfiltration, ultrafiltration, nanofiltration or reverse osmosis membranes optionally in the form of flat sheets.

BACKGROUND

Flat sheet filtration membranes may be made by casting a liquid (which may be a mixture of liquids) onto a substrate and then solidifying the liquid to form a separation layer. The liquid may be a polymer solution (often called a dope) or a two-part polymer-forming solution. The substrate may be for example a woven, knitted or non-woven fabric. The substrate is formed tightly relative to the viscosity of the liquid such that the liquid does not flow through the entire thickness of the substrate. The curing mechanism may be, for example, interfacial polymerization, non-solvent induced phase separation or temperature induced phase separation. Porous membranes are formed as a dope is solidified in a bath after casting. The resulting separation layer may have pores be in a range from nanofiltration to microfiltration, frequently ultrafiltration or microfiltration. Interfacial polymerization may be used to form a dense (i.e. substantially non-porous) separating layer in the reverse osmosis or nanofiltration range. In some cases, in particular for reverse osmosis membranes, there may be two liquid application steps, the first producing a porous membrane on the substrate and the second producing a dense membrane on the porous membrane.

Flat sheet membranes may be used, for example, in spiral wound, plate and frame or immersed flat sheet modules. In a typical spiral wound membrane, the membrane is formed with a separation layer on a non-woven fabric substrate. The membrane is folded and/or sealed around its edges to create an envelope around a permeate carrier. The permeate carrier is a structure able to resist compression but with an arrangement of voids, for example wales in a tricot fabric, that permit the flow of permeate into and through the permeate carrier. One or more envelopes are wrapped around a central tube with layers of feed carrier between adjacent layers of membrane. The entire structure is compressed and the membrane is further compressed against the permeate carrier by the applied feed liquid when in use. Conventional plate and frame modules have similar envelopes of membrane around permeate carrier but the envelopes are assembled into a stack of parallel planar forms typically (though not always) with intervening sheets of feed carrier. Immersed flat sheet membrane modules also have envelopes of membrane material surrounding a permeate carrier in a planar form but do not have intervening feed carrier layers. The spiral wound membranes and plate and frame membranes include a housing that confines a flow of feed water past the membranes whereas the immersed membranes are immersed in a relatively large tank of water with a free surface and less defined flow patterns. Immersed membranes tend to be assembled into large structure modules, for example 2-5 m$^2$ in area in at least one elevation view, whereas individual spiral wound and plate and frame modules tend to be more compact structures. The term flat sheet membrane may refer to a single sheet with a separation layer or to an envelope or other structure having two sheets, each with a separation layer, around a permeate collecting space.

The permeate carrier keeps the two sides of the membrane envelopes spaced apart from each other while providing a channel for permeate to flow to at least one collection point. The permeate carrier resists compression of the envelope due to transmembrane pressure applied during filtration. In some cases, particularly with immersed membranes, the membranes are backwashed periodically. In these cases, the membrane is typically attached in at least some places within its edges to the permeate carrier and the permeate carrier, and any other substrates, adhesives or other intervening materials, must also resist expansion of the membrane envelope if there is no sufficiently close feed carrier. The various materials must also resist delamination (or other separation) within or between them.

In one example of a backwashable immersed membrane sold by Microdyn-Nadir, a separating layer is cast onto a non-woven fabric substrate. The substrate is bonded with a dis-continuous adhesive sheet to a permeate carrier in the form of a 3D spacer fabric. This material is reasonably successful in use as an immersed membrane, but may become unstable during filtration under large transmembrane pressures or separate under frequent or high-pressure backwashes. In another example of a backwashable immersed membrane sold by Bluefoot, a membrane is cast directly onto a 3D spacer woven with many filaments such that the outer layers of the 3D spacer fabric can function as a substrate themselves. This material is not commonly used in industry but may have sufficient strength for filtration and backwashing. However, this material requires thick separating layers since the outer layers of the 3D spacer fabric are not as smooth and dense as a non-woven fabric. The heavily built 3D spacer fabric also consumes a significant amount of material.

INTRODUCTION

This specification describes one or more membranes having integrated posts extending from at least one separation layer of membrane material. The posts extend (a) from a separation layer through one or more supporting structures such as a substrate layer and/or a permeate carrier, (b) between two separation layers, or (c) both. A post extending from a separation layer into or through one or more supporting structures may help to attach the separation layer to a supporting structure and/or to attach two supporting structures together A post extending between two separation layers may help to attach the two separation layers to each other. The posts may help to resist compression and/or expansion of a membrane during filtration and/or backwashing respectively. A membrane with two separation layers may have a continuous space (i.e. a space without a permeate carrier) or a discontinuous space (i.e. a space without a permeate carrier) between the two separation layers. A membrane might have a separation layer supported on a substrate layer or might not have a separation layer that is not supported on a substrate layer.

This specification describes one or more methods of making a membrane. In some examples, one or more supporting structures that will remain in the membrane are made with openings for posts. In some examples, a temporary (i.e. soluble) supporting structure is made with openings for posts. For example, a supporting structure may be pierced, optionally by a roller or plate with protrusions, either cold or heated, to produce the openings. A liquid containing the separation layer material, for example in the form of a dope or other mixture or solution, is cast over the supporting structure or structures and some of the liquid flows at least part way through the openings before the liquid is solidified. A temporary supporting structure may be removed during or after a step of solidifying the liquid. For example, the temporary structure may be dissolved. In other examples, two substrate layers or other supporting structures are made with openings for posts and held apart, for example by a center plate or other component of a casting assembly, while a liquid containing the separation layer material is cast over the supporting structure or structures. Some of the liquid flows through the openings and is solidified to form posts that extend between two separation layers.

DETAILED DESCRIPTION

This specification describes various membranes, for example flat sheet membranes. The membranes may have separation layers in the range of reverse osmosis, nanofiltration, ultrafiltration or microfiltration, preferably ultrafiltration or microfiltration. The membranes can be used, for example, in housings (with or without forming a conventional plate and frame type envelope) or as immersed membrane modules. In at least some examples, the membranes can be backwashed.

The term post refers to a structure extending from a separation layer of a membrane. The post may be integral with the separation layer, but extends from the separation layer in the sense that the post departs from the typical thickness prevalent over most (i.e. at least 50% in surface area) of the separation layer. In some cases a post extends from one separation layer to a separation layer or a substrate layer on the other side of the membrane. A membrane with a post extending between two separation layers or otherwise from one side of the membrane to the other side of the membrane may be called a 3D membrane.

Figure 1:
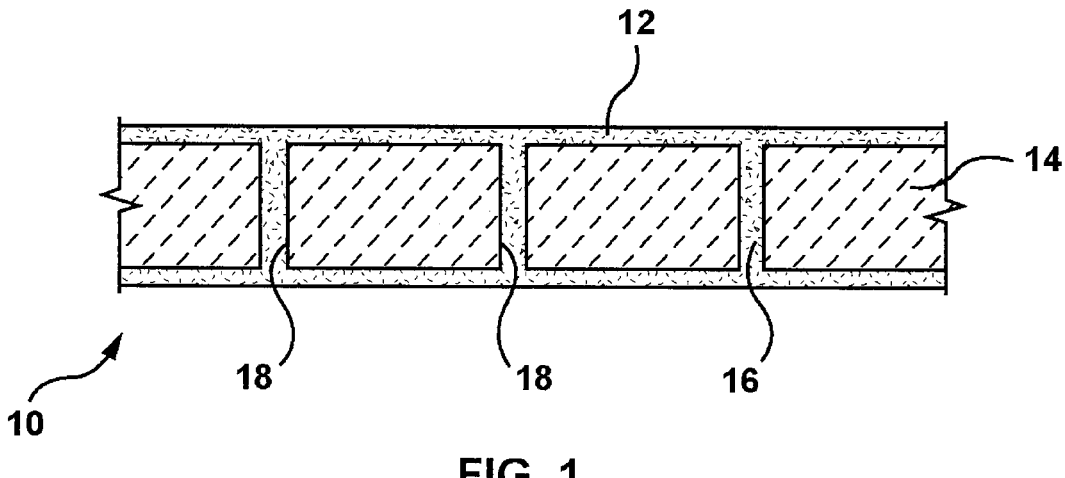
FIG. 1 is a schematic cross section of an unsupported 3D membrane made with a soluble supporting structure.
Figure 2:
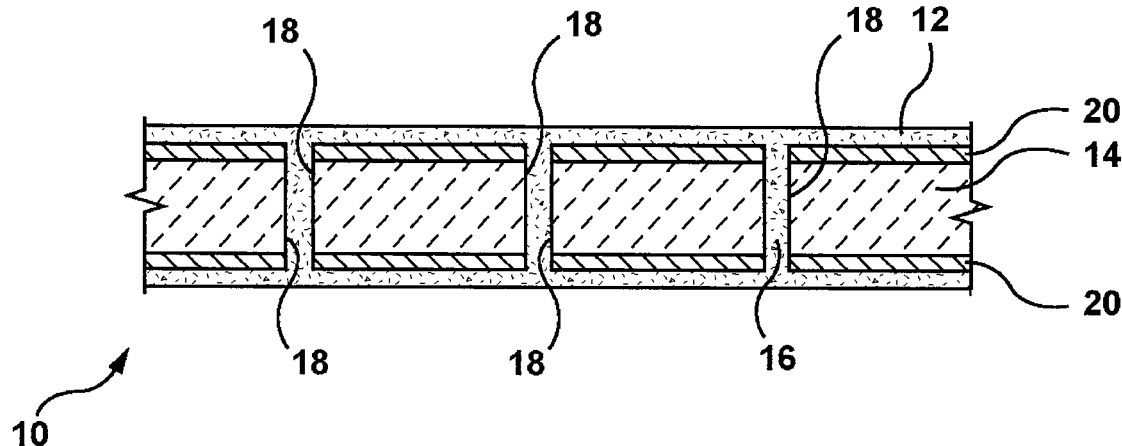
FIG. 2 is a schematic cross section of a supported 3D membrane made with a soluble supporting structure.

Referring to FIG. 1, a precursor to a first 3D membrane 10 is shown. The completed first 3D membrane 10 would be as shown in FIG. 2 but without the soluble substrate 14. The first 3D membrane 10 has two separation layers 12 separated and connected together by posts 16. The posts 16 are made of the same material as the separation layers 12, which may be a porous membrane forming dope, i.e. a liquid containing a polymer in a solvent, possibly with other components, that will form the separation layer. In this example, the posts 16 are formed before the liquid is solidified and are integral with the separation layers 12. A dope may comprise, for example, one or more polymers such as PVDF, PS, PES, PPEK, PPS, PVC, or CA and at least one organic solvent. When the soluble substrate 14 is removed, a permeate collecting space is formed without a permeate carrier.

The separation layers 12 are formed directly on the soluble substrate 14. The soluble substrate 14 has a plurality of openings 18 that form the posts 16. The openings 18 can be formed, for example, by passing a roller with protrusions over a sheet of the soluble substrate 14, optionally achieved by passing the sheet of soluble substrate 14 through a pair of rollers, or by pressing a plate with protrusions, which may be cold or heated, against a sheet of the soluble substrate 14. Alternatively, laser cutting or another suitable method of making the openings 18 may be used or the soluble substrate 14 (or any other material with openings 18) may be made by a method that creates the openings 18 as the soluble substrate 14 is formed into a sheet. The openings 18 can be in an orthogonal or staggered grid or other arrangement such that they are dispersed, preferably substantially evenly, over the area of the soluble substrate 14.

The soluble substrate 14 may be, for example, an open or closed cell foamed sheet or a textile sheet (for example a non-woven sheet) made of a soluble polymer such as hemicellulose or PVA. In some examples, a foamed hemicellulose sheet with a void fraction in the range of 60-90% may be used. The soluble substrate 14 may be in the range of 1 to 8 mm thick. The openings 18 may be cylindrical with a diameter in the range of 0.1 to 1.5 mm or another shape with a similar cross-sectional area. The openings 18 may be arranged, for example, in an orthogonal or offset (i.e. staggered) grid with a spacing between openings 18 in the range of 1-15 mm.

In one example, the separating layers 12 are made from a dope that is solidified by passing the precursor with liquid dope into a quench bath. The soluble substrate 14 may be water soluble and the quench bath may contain water. The soluble substrate 14 may dissolve in the quench bath, in a later bath (i.e. a downstream bath or later in time), or partially in both. The soluble substrate 14 may dissolve at least in part while the dope is solidifying, or not. Allowing the soluble substrate 14 to dissolve at least in part before the dope is fully solidified can be done intentionally to provide a slightly uneven or wavy surface to the solidified separation layer 12, if desired. Alternatively, a more nearly flat separation layer 12 can be provided by restricting the amount, if any, that the soluble substrate 14 dissolves before the dope has solidified. The rate of dissolution of the soluble substrate 14 can be modified, for example, by altering the density (i.e. void fraction) of the soluble substrate 14 or the temperature of the bath. Optionally, dissolution of the soluble substrate 14 in a first bath can be substantially prevented by allowing the dope to flow around and cover the edges of the soluble substrate 14. In this way, the soluble substrate 14 is substantially encased in the dope and, after the dope solidifies, the separation layer 12. In this case, dissolution of at least some of the soluble substrate 14 can be deferred to a later bath after the dope has fully solidified to form the separation layer 12. The first membrane 10 is cut to expose one or more edges of the soluble substrate 14 before the membrane is placed in the later bath to dissolved the soluble substrate 14.

FIG. 2 shows a precursor for a second 3D membrane 10. The completed second 3D membrane 10 would be as shown in FIG. 2 but without the soluble substrate 14. The second 3D membrane 10 has two separation layers 12 separated and connected by posts 16. The posts 16 are made of the same material as the separation layers 12, which may be a porous membrane forming dope. In this example, posts 16 are formed before the liquid is solidified and are integral with the separation layers 12. When the soluble substrate 14 is removed, a permeate collecting space is formed without a permeate carrier.

The second 3D membrane 10 also contains substrate layers 20, one adjacent to the inside of each separation layer 12. Each substrate layer 20 may be, for example, a woven, knitted or non-woven sheet. In the completed second 3D membrane 10, the separation layers 12 may adhere to the substrate layers 20 by chemical and/or physical forces.

The separation layers 12 are formed on the substrate layers 20 which are supported on the soluble substrate 14. The soluble substrate 14 and the substrate layers 20 have a plurality of corresponding openings 18 that form the posts 16. The openings 18 can be formed, for example, by passing a roller with protrusions over an assembly of the soluble substrate 14 and the substrate layers 20, or by pressing a plate with protrusions against an assembly of the soluble substrate 14 and the substrate layers 20, or by any other method described for the soluble substrate 14. Alternatively, the openings 18 can be formed in the soluble substrate 14 and the substrate layers 20 separately. The openings 18 can be in an orthogonal grid or other arrangement such that they are dispersed, preferably evenly, over the area of the soluble substrate 14 and substrate layers 20.

In one example, a dope is solidified to form the separation layers 12 by passing the precursor into a quench bath. The soluble substrate 14 may be water soluble and the quench bath may contain water. The soluble substrate 14 may dissolve in the quench bath, in a later bath, or partially in both. The soluble substrate 14 may dissolve at least in part while the dope is solidifying, or not. The rate of dissolution of the soluble substrate 14 can be modified, for example, by altering the density of the soluble substrate 14 or the temperature of the bath. Optionally, dissolution of the soluble substrate 14 in a first bath can be substantially prevented by allowing the dope to flow around and cover the edges of the soluble substrate 14. In this case, dissolution of at least some of the soluble substrate 14 can be deferred to a later bath, after the dope has fully solidified. The second 3D membrane 10 is cut to expose one or more edges of the soluble substrate 14 before the membrane is placed in the later bath.

Figure 3A:
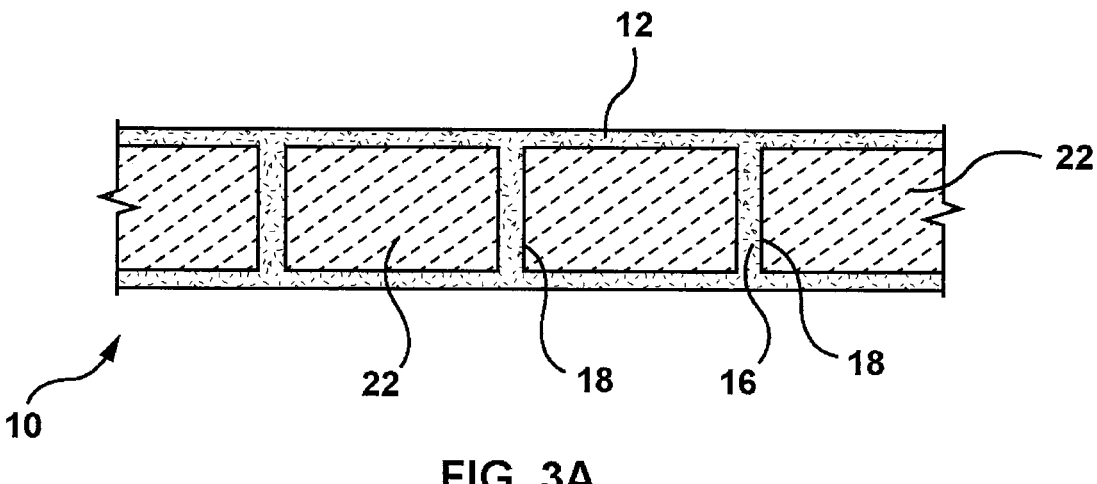
FIG. 3A is a schematic cross section of another 3D membrane with a permanent supporting structure.

FIG. 3A shows a third 3D membrane 10. A precursor and a completed third 3D membrane 10 may both be as shown in FIG. 3A. The third 3D membrane 10 has two separation layers 12 separated and connected by posts 16. The posts 16 are made of the same material as the separation layers 12, which may be a porous membrane forming dope. In this example, the posts 16 are formed before the liquid is solidified and are integral with the separation layers 12.

Figure 3B:
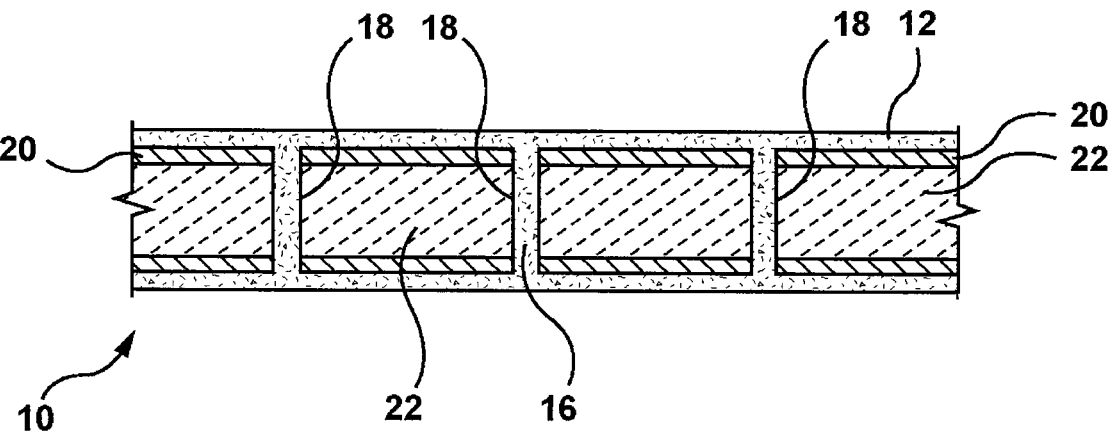
FIG. 3B is a schematic cross section of another supported 3D membrane with a permanent supporting structure.

The third 3D membrane 10 also contains a permeate spacer 22 adjacent to the inside of each separating layer 12. The permeate spacer 22 may be, for example, a 3D spacer fabric, a mesh, a fabric such as a tricot fabric, or an extruded or milled form such as an extruded sheet with interior channels. Optionally, voids of the permeate spacer 22 may be temporarily filled with a soluble or otherwise removable substance while the separating layers 12 are formed on it. In the completed third 3D membrane 10, the separation layers 12 may adhere to the permeate spacer 22 by chemical and/or physical forces. The permeate spacer 22 in the example of FIG. 3A also functions also a substrate directly supporting at least one of the separation layers 12. Alternatively, in a fourth 3D membrane 10 as shown in FIG. 3B, substrate layers 20 as in FIG. 2 may be added between the permeate spacer 22 and the separation layers 12. The substrate layers 20, if any, may be bonded to the permeate spacer 22 or not. Substrate layers 20 may be for example woven, knitted or non-woven fabric sheets.

The separation layers 12 can be formed directly or indirectly on the permeate spacer 22. The permeate spacer 22 has a plurality of openings 18 that form the posts 16. The openings 18 can be formed, for example, by passing a roller with protrusions over the permeate spacer 22, or by pressing a plate with protrusions against the permeate spacer 22 or by any other method described for the soluble substrate 14. Openings 18 are formed in any substrate layers 20 as described in FIG. 2. In one example the openings 18 are optionally formed during formation of the permeate spacer 22, for example in a 3D weaving process. The openings 18 can be in an orthogonal grid or other arrangement such that they are dispersed, preferably evenly, over the area of the permeate spacer 22.

In one example, the dope is solidified by passing the precursor into a quench bath. The permeate spacer 22 remains as part of the finished third membrane 10 and is not dissolved in the bath or otherwise removed.

In the examples of FIGS. 1, 2, 3A and 3B, a 3D membrane 10 is produced with outer separation layers 12 connected to each other by polymeric posts 16 made of the same material as the separation layers 12 and formed while casting the separation layers 12. The posts 16 are integral with the separation layers 12. The posts 16 pass through a gap between the separation layers 12. The gap might or might not contain one or more supporting structures such as a substrate layer 20 and/or permeate spacer 22. In the examples of FIGS. 1, 2, 3A and 3B, the gap has a generally even thickness. However, in other examples the gap might be of uneven thickness or not present over the entire area of the membrane 10. For example, in a corrugated membrane two substrate layers 20 may be bonded to each other along a plurality of lines or other areas of contact and a self-supporting structure may be created without a soluble or permanent support or permeate carrier. In this case, the posts 16 may be located along the areas of contact and extend from one separating layer 12 to the other through the two substrate layers 20. In all of these examples a three dimensional membrane is formed with one or more void spaces (which may be void spaces containing a permeate carrier 22 or not) between separation layers 12 with or without support other than the posts 16 for the separation layers 12. In various examples, the membrane 10 may have substrate layers 20 or not.

Figure 4:
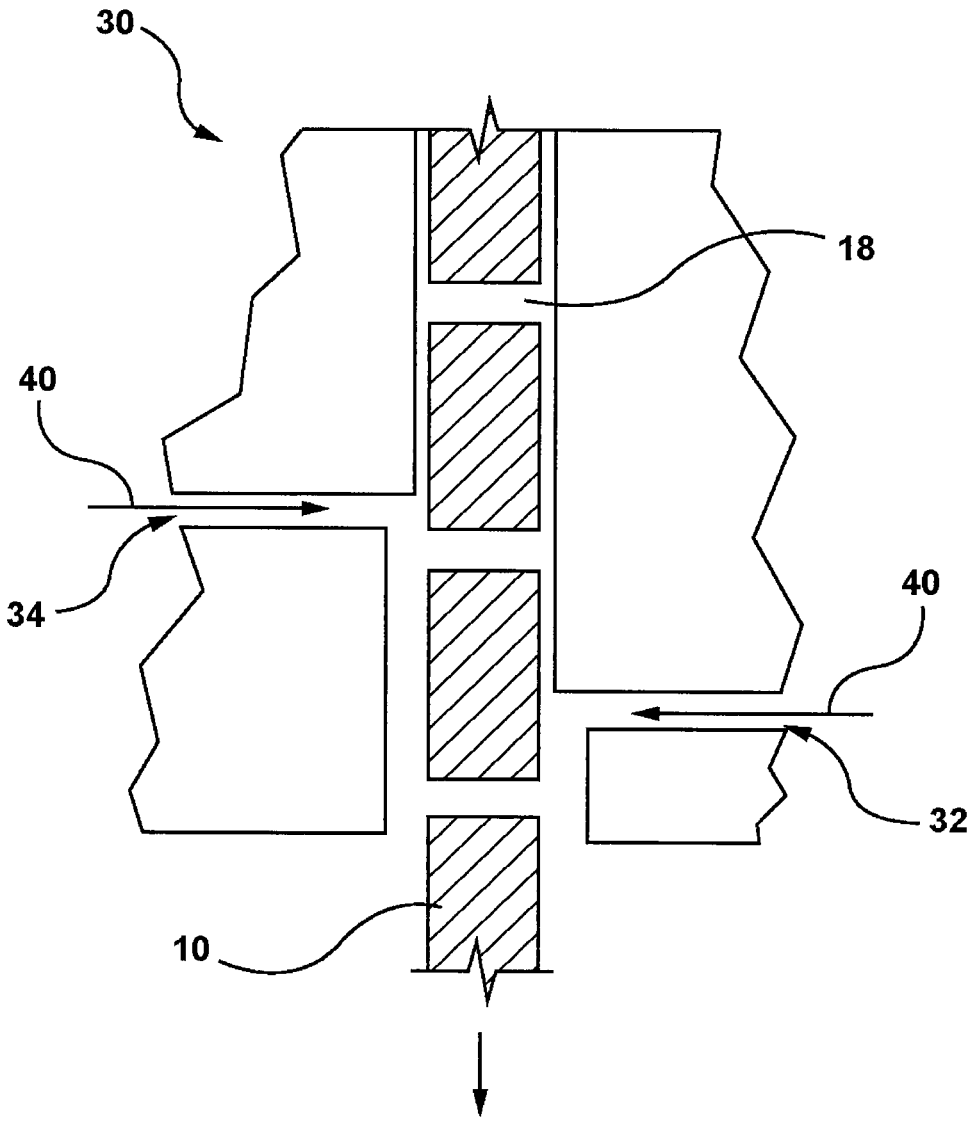
FIG. 4 is a schematic cross section of 3D membrane according to any of FIG. 1, 2, 3A or 3B during a casting step.

FIG. 4 shows a schematic cross sectional side view of a 3D membrane 10 during a casting step. A supporting structure, which may include one or more of a soluble substrate 14, substrate layers 20 and/or permeate carrier 22, is pulled downwards through a casting knife 30, alternatively called a casting head or a casting assembly. Casting knife 30 has a lower casting nozzle 32 and an upper casting nozzle 34. Openings 18 are primarily filled with dope provided from the lower casting nozzle 32, which optionally operates at higher pressure than the upper casting nozzle 34. To improve dope flow and air removal from the openings 18 a suction can be applied through nozzles positioned opposite to the upper nozzle 34. Offsetting the nozzles 32, 34 and having nozzles 32, 34 with different pressure helps avoid trapping air in the openings 18.

Figure 5:
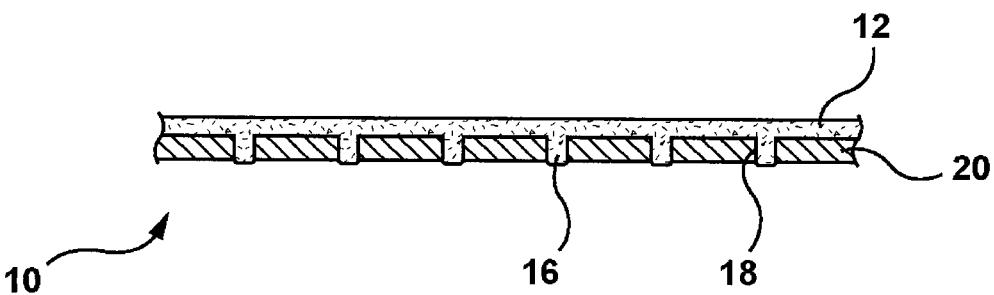
FIG. 5 is a schematic cross section of a flat sheet membrane having a separation layer and a substrate layer.

FIG. 5 is a schematic cross section of a flat sheet membrane 10 having a single separation layer 12 and a single substrate layer 20. This membrane 10 is made by casting a dope over a substrate layer 20 provided with openings 18 as described in other parts of this specification. The resulting posts 16 may help to adhere the separation layer 12 to the substrate layer 20 and/or may help avoid separation or delamination of the substrate layer 20 itself. Optionally, the flat sheet membrane 10 may be used to make an envelope or other structure. For example, the flat sheet membrane 10 may be assembled into a spiral wound membrane module, a plate and frame membrane module, or an immersed flat sheet membrane module in the same manner as a conventional flat sheet membrane with a separation layer simply coated on a substrate layer.

Figure 6:
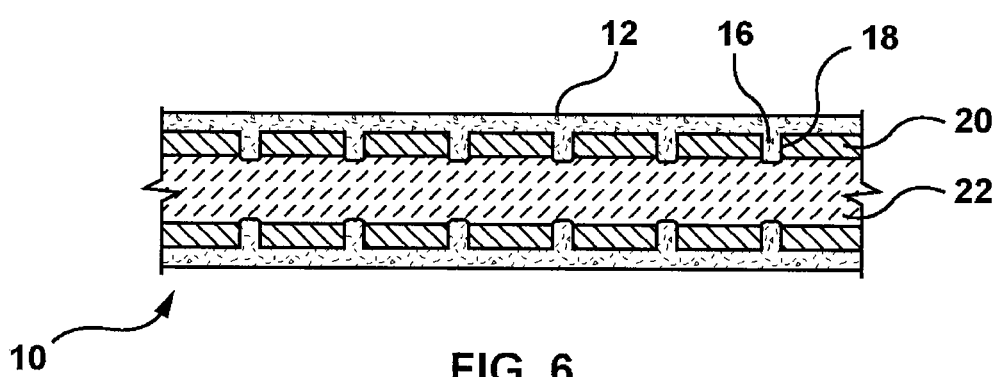
FIG. 6 is a schematic cross section of another membrane having two separation layers, two substrate layers and a permeate carrier layer, in this example the permeate carrier layer being a 3D spacer fabric bonded to the substrate layers by posts or columns or by a separate adhesive (not shown) or both.

FIG. 6 is a schematic cross section of a membrane 10 having two separation layers 12, two substrate layers 20 and a permeate carrier 22. The permeate carrier 22 may be bonded to the substrate layers 20, for example by a separate adhesive (not shown), or not. For example, flat sheet membranes 10 may be made as described in FIG. 5 and then bonded (i.e. glued, welded or solvent bonded) to a permeate carrier 22. Alternatively, the separation layers 12 may be formed after the substrate layers 20 are placed on (and optionally bonded to) the permeate carrier 22. In this case, the posts 16 may bond to the permeate carrier 22. In another option, the permeate carrier 22 may have openings extending part way into the permeate carrier but not completely though the permeate carrier 22. In this option the posts 16 are anchored within the thickness of the permeate carrier 22, rather than being bonded primarily to the surface of the permeate carrier.

In the example shown, the permeate spacer 22 is a 3D spacer fabric, although alternatively another permeate spacer may be used. Part of the posts 16 may be embedded in parts of the outer layers of the 3D spacer fabric. However, the outer layers of the 3D spacer fabric are sufficiently filled with filaments relative to the forces applied during casting and viscosity of the dope (or other separation layer forming liquid) such that the liquid does not pass completely through the outer layers of the 3D spacer fabric. The posts 16 can be embedded in filaments that reside only in the outer layers of the 3D spacer fabric or might also be embedded in filaments that pass between the outer layers of the 3D spacer fabric.

A 3D spacer fabric may alternatively be called a double face or double cloth fabric or, for brevity, a 3D spacer or a spacer fabric. A 3D spacer fabric is made, for example by knitting or weaving, such that it has an inner space between two outer layers. One or more threads that are also woven or knitted into the outer layers extend across the inner space to connect the outer layers together, and optionally also space the outer layers apart. In some examples, the inner space between the two outer layers is partially further filled, for example with another fabric layer. In use, permeate flows through, and is withdrawn from, a drainage layer that remains open in the inner space of the spacer fabric. Examples of suitable spacer fabrics are described in: U.S. Pat. No. 8,393,477 B2, Filter Medium; International Publication Number WO 2011/026879 A1, Frame for Supporting a Filter Membrane; International Publication Number WO 2008/141935 A1, Membrane Bags with Seamless Membrane Substance, Uses Thereof and Filtration Units Therewith; International Publication Number WO 2012/098130 A1, A Tridimensional Woven Fabric, an Integrated Permeate Channel Membrane Comprising Said Fabric and Uses Thereof; U.S. Pat. No. 7,862,718 B2, Integrated Permeate Channel Membrane; US Patent Application Publication Number US 2013/0186827 A1, Forward Osmosis Membrane Based on an IPC Spacer Fabric; U.S. Pat. No. 6,634, 190 B2, Double-Faced Thick Knitted Fabric with Flexible Structure; and, German Gebrauchsmuster 89 02 259 U1. All of these publications are incorporated herein by reference. Warp-knitted spacer fabric made for other applications, such as automobile interiors or clothing, may also be used, for example as sold by Eastex Products, Apex Mills or Jason Mills.

Figure 7:
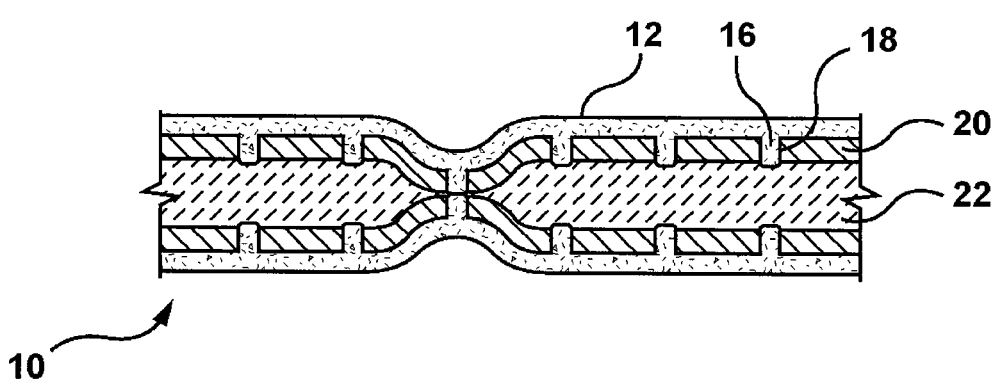
FIG. 7 is schematic cross section of a 3D membrane made without a temporary supporting structure but with, in this example, an intermittent or periodically compressed permeate carrier.

FIG. 7 is schematic cross section of another 3D membrane made with an optional intermittent or compressible permeate carrier 22. Two layers of substrate material 20 are contacted together, for example in parallel lines or in a grid or other arrangement of areas of contact. The layers of substrate material 20 can be held together at points of contact, for example by an adhesive, heat or laser welding, optionally with a compressed and optionally melted section of permeate carrier 22 between them. Openings 18 are formed as described in other parts of this specification. Posts 16 passing between the separating layers 12 reinforce the bond between the substrate material 20 at the areas of contact. Additional posts 16 outside of the areas of contact are optional. The layers of substrate material 20 can be contacted together before, during or after application of the separating layers 12. In some examples, FIG. 7 represents a modification of a conventional immersed flat sheet membrane as made, for example, by Kubota.

Figure 8:
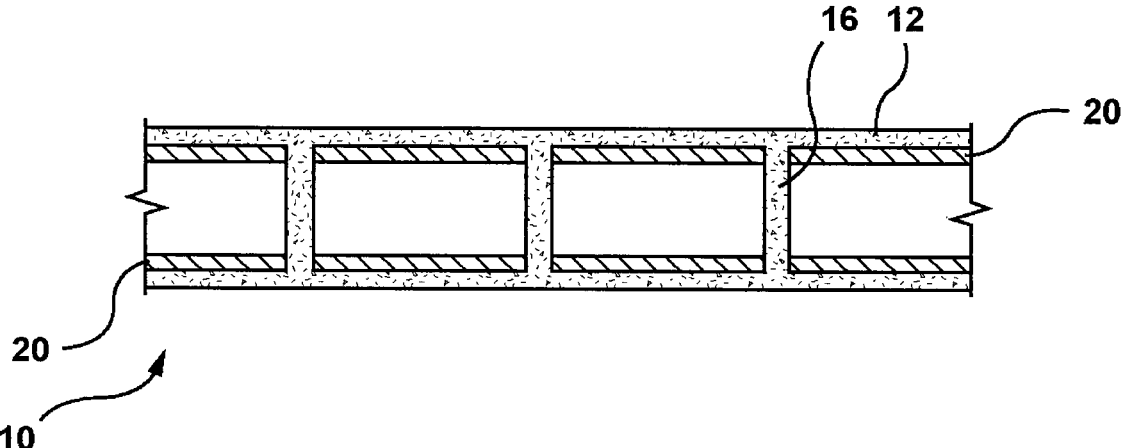
FIG. 8 is a schematic cross section of a supported 3D membrane made without a temporary supporting structure or permeate carrier.

FIG. 8 shows a fifth 3D membrane 10. The fifth 3D membrane 10 is made without a permeate carrier and without a soluble substrate. The fifth 3D membrane 10 has two separation layers 12 separated and connected by posts 16. The posts 16 are made of the same material as the separation layers 12, which may be a porous membrane forming dope. In this example, posts 16 are formed before the liquid is solidified and are integral with the separation layers 12.

The fifth 3D membrane 10 also contains substrate layers 20, one adjacent to the inside of each separation layer 12. Each substrate layer 20 may be, for example, a woven, knitted or non-woven sheet. In the completed fifth 3D membrane 10, the separation layers 12 may adhere to the substrate layers 20 by chemical and/or physical forces.

Figure 9:
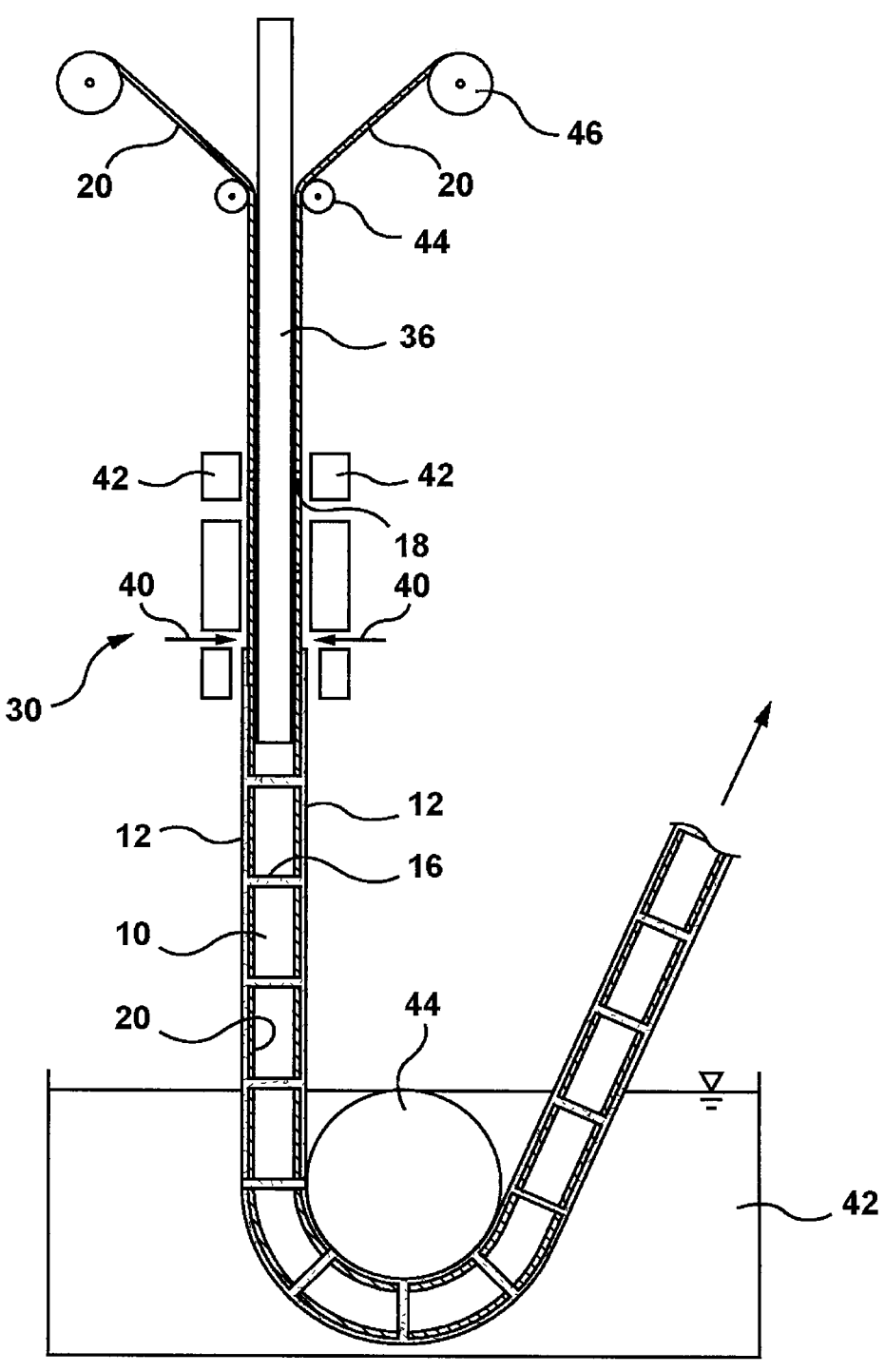
FIG. 9 is a cross-sectional side view of a casting assembly in use making the supported 3D membrane of FIG. 8.
Figure 10:
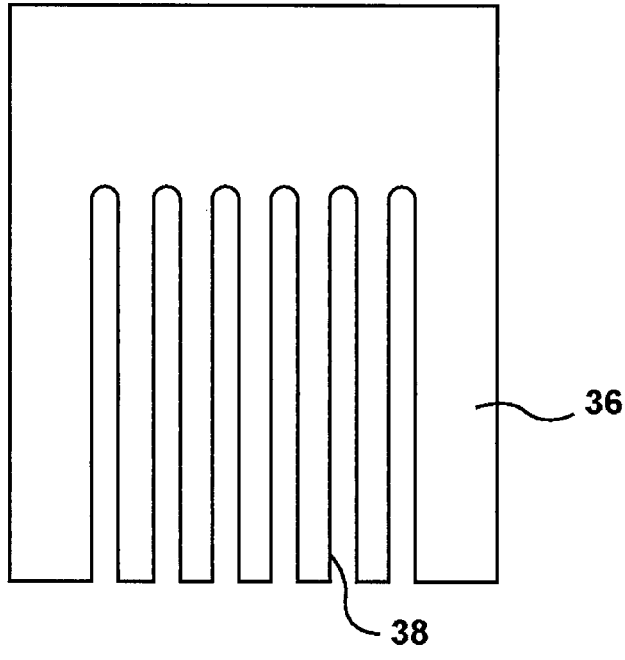
FIG. 10 is an elevation view of a center plate of the casting assembly of FIG. 9.
Figure 11:
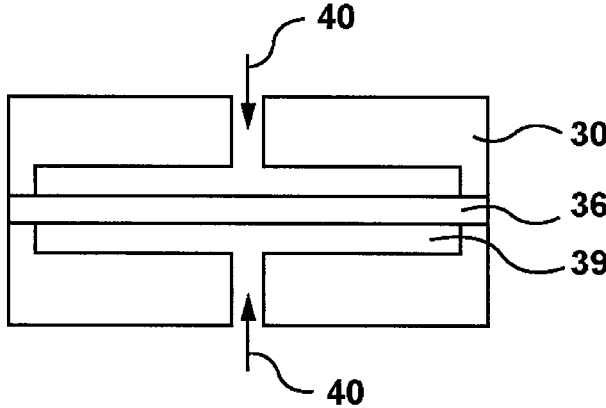
FIG. 11 is a top view of the casting assembly of FIG. 9.

Referring to FIGS. 9 to 11, substrate layers 20 are unwound from spools 46 and pulled through a casting knife 30. The substrate layers 20 are supported on a center plate 36 of a casting knife 30 as they travel through the casting knife 30. For example, a substrate layer 20 may pass through a gap 39 (shown in FIG. 11) inside the casting knife 30 on each side of the center plate 36. The center plate 36 has a series of slots 38 (see FIG. 10). A hole cutter 42, for example a laser cutter, a knife, or a roller with protrusions radiating outwards from it, cuts a series of openings 18 in the substrate layers 20 as they pass by the hole cutter 42. The hole cutter 42 may act against a solid surface of the center plate 36 or through a slot 38 of the center plate 36. Dope 40 is injected into the casting knife 30 and flows over the substrate layers 20 as they pass through the casting knife 30 to form separation layers 12. Some of the dope passes through the openings 18 and the slots 38 to form posts 16.

In one example, a dope 40 is solidified to form the separation layers 12 by passing the coated substrate layers 20 into a quench bath 42. The posts 16 also solidify in the quench bath 42. The resulting membrane 10 can be wrapped around a roller 44 and withdrawn from the quench bath 42. Optionally, the center plate 36 may extend into the quench bath 42.

Figure 12:
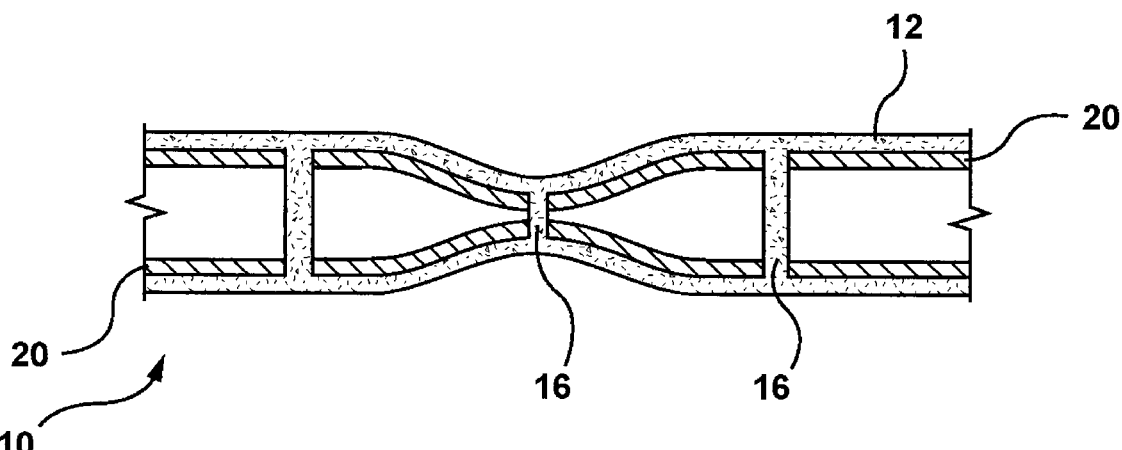
FIG. 12 is a schematic cross section of a supported 3D membrane made without a temporary supporting structure or permeate carrier but with an undulating substrate layer.

FIG. 12 shows a sixth 3D membrane 10. The sixth 3D membrane 10 is similar to the fifth 3D membrane 10 of FIG. 8 and the description of the fifth 3D membrane 10 and how it is made applies, unless inconsistent, to the sixth 3D membrane 10. The sixth 3D membrane 10 is made by a process as described for the fifth 3D membrane 10 and with equipment generally as shown in FIGS. 9, 10 and 11, except as described herein. The substrate layers 20 of the sixth 3D membrane 10 come close to each other, and optionally contact each other, along some lines. In the example shown, there are some posts 16 in locations where the substrate layers 20 are spaced apart from each other and some posts 16 where the substrate layers 20 are closer to each other or contact each other. In this case, some of the posts 16 are shorter than the other posts 16. In other examples, the substrate layers 20 may come close to each other or contact each other along every line of posts 16. The undulating shape of the substrate layers 20 is maintained through areas where the substrate layers 20 come close to each other or contact each other by a corresponding shape of the casting knife 30 and/or by tension between upper and lower rollers 44, which may have undulating shapes corresponding to the undulating shapes of the substrate layers 20. The center plate 36 may have large gaps 38 or be made in multiple spaced apart segments to provide areas where the substrate layers 20 can be closer to or in contact with each other. Optionally, the substrate layers 20 may also be connected together, for example by lines of an adhesive or sonic welding or heat welding, where the substrate layers 20 contact each other. Optionally, the substrate layers 20 may be connected together in line with the casting process, for example by a heating element or ultrasonic welding horn in an upstream part of the casting head 30 or in a separate unit upstream of the casting head 30. Alternatively, the substrate layers 20 may be connected together only by the solidified posts 16.

As discussed and illustrated by way of examples above, in some examples a three dimensional membrane has two outer separation layers connected to each other by polymer posts made by the same material as the separation layers and formed during casting of the separation layers. In some examples, a three dimensional membrane has a continuous or discontinuous permeate collecting space between two separation layers connected to each other by polymer posts with or without a substrate supporting the separation layers and with or without a permeate carrier. In some examples, a flat sheet membrane has a separation layer, a substrate layer and posts extending from the separation layer into openings of the substrate layer.

Although the examples above have all been flat sheet membranes, the invention may be adaptable to other forms of membranes. For example, some hollow fiber or tubular membranes are cast over a supporting structure such as a knit or braided tube or spiral wrapped fabric ribbon. These membranes may additionally or alternatively have a soluble core. The core and supporting structure, if any, may be pierced through a chord or diameter of the core. When a dope is cast over the core, some of the dope flows though the pierced cords and/or diameters and create, when solidified, posts through the membrane.

The invention claimed is:

1. A membrane comprising,
 a pair of separation layers; and
 a plurality of posts, each post extending between and connecting the pair of separation layers
 wherein:
 each of the plurality of posts is integral with each of the pair of separation layers;
 the posts and the separation layers are made of a porous membrane forming dope;
 the posts consist essentially of the porous membrane forming dope.

2. The membrane of claim 1 wherein comprising one or more supporting structures, and wherein the posts extend through the at least one or more supporting structures.

3. The membrane of claim 2 wherein the one or more supporting structures comprises a substrate layer.

4. The membrane of claim 2 wherein the one or more supporting structures comprise a permeate carrier.

5. The membrane of claim 1 without a permeate carrier.

6. The membrane of claim 1 wherein the first and second separation layers are supported directly on a 3D spacer.

7. The membrane of claim 1 having two substrate layers, wherein each of the first and second separation layers is supported on one of the substrate layers.

8. The membrane of claim 7 further comprising a permeate carrier between the two substrate layers.

9. The membrane of claim 7 without a permeate carrier.

* * * * *